US006300955B1

(12) United States Patent
Zamir (10) Patent No.: US 6,300,955 B1
(45) Date of Patent: Oct. 9, 2001

(54) METHOD AND SYSTEM FOR MASK GENERATION

(75) Inventor: Haim Zamir, San Jose, CA (US)

(73) Assignee: MGI Software Corporation, Richmond Hill (CA)

(*) Notice: Subject to any disclaimer, the term of this patent is extended or adjusted under 35 U.S.C. 154(b) by 0 days.

(21) Appl. No.: 08/922,578

(22) Filed: Sep. 3, 1997

(51) Int. Cl.$^7$ .......................... G06T 11/00; G06F 13/00; G06K 9/34
(52) U.S. Cl. .......................... 345/433; 382/175; 345/523
(58) Field of Search .................... 345/419, 426, 345/431, 432, 435, 144, 113, 114, 523, 429, 441; 382/173, 175

(56) References Cited

U.S. PATENT DOCUMENTS

| | | | | |
|---|---|---|---|---|
| 5,220,614 | * | 6/1993 | Crain | 382/136 |
| 5,382,980 | * | 1/1995 | Gehrmann | 348/586 |
| 5,874,966 | * | 2/1999 | Polimeni et al. | 345/431 |

OTHER PUBLICATIONS

R.C. Gonzales, Digital Image Processing, Addison–Wesley, Reading, MA, 1992, pp. 418–420.
R.E. Tarjan, Data Structures and Network Algorithms, Society For Industrial and Applied Mathematics, Philadelphia, PA, 1983, pp. 85–95.

* cited by examiner

Primary Examiner—Mark R. Powell
Assistant Examiner—Chante' E. Harrison
(74) Attorney, Agent, or Firm—Blakely, Sokoloff, Taylor & Zafman (57) ABSTRACT

A method for generating a mask for a desired portion within a digital image including selecting a region containing a boundary of the desired portion, the region being at least partially bounded by an inner outline and an outer outline, the inner outline lying inside of or on the boundary and the outer outline lying outside of or on the boundary, detecting edges which lie within the region using an automated edge detector, and generating a mask based on the region and the edges. A system for carrying out the method is also described and claimed.

66 Claims, 7 Drawing Sheets

(4 of 7 Drawing Sheet(s) Filed in Color)

METHOD AND SYSTEM FOR MASK GENERATION

FIELD OF THE INVENTION

The present invention relates to digital image compositing within a graphic arts environment.

BACKGROUND OF THE INVENTION

A common tool used in digital image compositing is a silhouette tool. It enables a graphic designer to cut out a desired portion of a photograph, such as a subject in the picture, for use with an image under design. Alternatively, the desired portion can be cut out of the photograph so as to leave a transparent hole. The shape of the portion being cut out is typically non-rectangular, so that more processing is involved than that required to provide simply a rectangular clipping. The objective of a silhouette tool is thus to find (and represent) the shape of the portion to be cut out as automatically as possible. Several different tools are currently in use by various companies.

For example, a designer could begin with a photograph of an entire family, and desire to cut out the father's face from the picture. The silhouette tool would have to remove everything from the photograph except the father's face. In another example, the photograph might have a picture of a woman speaking on a telephone, and the designer would want to cut the telephone out of the picture. In this case, the silhouette tool would leave everything in the photograph intact, except for the telephone which is removed.

In the world of digital images, every image is a rectangular array of pixels. A non-rectangular shape, such as a man's face, cannot be stored as an independent image in itself. Instead, it must be part of a larger rectangular image. What is commonly done to delineate the face is to assign to each pixel location an opacity value, indicating the degree of transparency of the image color at that pixel location. An opacity of 0% indicates complete transparency—so that the image color at that pixel location is not seen at all. An opacity of 100% indicates that the image color is opaque, and is seen over any background. Opacity values between 0% and 100% are used to indicate partial transparency. Opacity is a way of enabling a designer to superimpose images on top of one another, and indicate how the composite image appears.

Thus, to create an image of a man's face alone, one can identify the pixel locations corresponding to the man's face and label them as opaque, with an opacity of 100%, and label all the other pixel locations as transparent, with an opacity of 0%. More generally, one would prefer to taper the opacity values, so that artifacts such as fringes around the edges are diminished.

One type of silhouette tool commonly used employs an image mask. In its barest form, a mask is simply an array of bits used to indicate which pixels are within the desired portion being silhouetted. More generally, a mask is an array of opacity values, used to mark the desired portion of the image as opaque, and the undesired portion as transparent, with some transition opacity values between the two extremes. Still more generally, a mask could be represented in resolution-independent coordinates, so that it can be digitized to a pixel mask at whatever sampling resolution the image is being displayed or printed.

In many applications silhouetting is accomplished by background elimination. For professional photographs, the subject being silhouetted is typically the portion of the photograph which is not background. Conventional techniques such as "blue screen" generate masks by accepting as input the background color and eliminating all pixels with colors close to the background color. This works well, provided the background color is not also an integral color within the subject of the photograph. Saturated blue, for example, is typically used since it is the least dominant color in human skin. The background color can be keyed to chrominance or to luminance, hence the use of "luma key" and "chroma key" for masking. The luma key process correlates image luminance over an entire image to an opacity map, and the more general purpose chroma key process relies on global color differences in an image.

Another commonly used tool employs curvses constituting a boundary path of the desired portion. Whereas the natural representation for a mask is in raster format, the natural representation for a boundary path is in vector format. Of course, the mask and the boundary curves can be converted one to another.

Several commercial products use the techniques described above, among them PHOTOSHOP®, MASK PHOTOFUSION®. PHOTOSHOP® uses both the image mask and the boundary path approaches to silhouetting. Its pixel mask approach uses alpha channels. To define an alpha channel, the user creates a selection, which can then be saved into a new alpha channel, or else added or removed from an existing channel. The selection is created by using MA style tools such as rectangle, ellipse, and lasso for freehand drawing and by using a magic wand. The magic wand operates by selecting all pixels connected to a seed pixel within a pre-determined color range. PHOTOSHOP® also uses a path approach, using Bezier curves with an Illustrator®-type interface. Bezier curves are constructed by using multiple control points as guides to determine location and slope along the curve, and are well known in the art.

MASK channel and path modes. By using a straight line, B-spline and edge finding tool in alternation, a user marks a series of anchor points to define a shape which, once closed, is added to or subtracted from the mask. The edge finding tool operates by detecting an edge in a neighborhood of a segment. Automatic edge detection identifies edges as groups of pixel locations where there are abrupt changes in image color. Techniques for automatic edge detection are described in Gonzalez, R. C., *Digital Image Processing*, Addison-Wesley, Reading, Mass, 1992, pgs. 418–420, the disclosure of which is hereby incorporated by reference.

PAINTER® is similar to PHOTOSHOP®, and allows the user to base the mask on luminance or chrominance. PHOTOFUSION® eliminates background using "blue screen" techniques, whereby the background pixel locations are identified by their uniform, or nearly uniform color, thereby determining the desired subject as those pixel locations which are not background.

Unless the user specifies the silhouette portion of the image with perfect or near-perfect accuracy, determining the mask or boundary path involves automated image processing—usually edge detection. Since there can be many edges within the subject being silhouetted, and only the boundary edges are of significance, this can be a formidable task. One approach to finding the boundary edges, referred to as "shrink-wrap" operates by having the user first designate a region which encompasses the desired portion to be extracted. The outline of the region is then shrunk inwards until it impinges upon edges. This technique works well when dealing with images with a featureless background, but for images with a complex background it can easily get fooled by spurious edges in the background.

Silhouetting tools which operate by edge detection are only successful if there is a substantial contrast between the subject being silhouetted and the rest of the image, and if the subject is opaque. Under low contrast conditions, or if the subject is transparent, the edges produced by these tools as a boundary path will suffer from error, and as a result, either too much or too little of the photograph will be included in the silhouette.

Thus it can be appreciated that a key weakness of present edge detection is its failure to produce good results when there is no artificial "blue screen" background and when there is weak contrast between the subject and the background. For example, this is the case when trying to cut out a father's face from a family portrait. The father's face may be positioned next to other faces, and current edge detectors would either cut too much out, by including portions of other faces, or cut too little out, by cutting into the father's face.

SUMMARY OF THE INVENTION

The present invention overcomes problems of edge detection when there is little contrast between the subject being silhouetted and the rest of the image, and when the background is not a simple uniform "blue screen." It operates by requiring more information from the user than is typically done. Whereas in tools that use the "shrink-warp" method, the user is only required to designate an area which encloses the subject, the present invention requires the user to highlight an area which encloses the boundary path of the subject. This serves to give an automated edge detector valuable information, which is used to aid in its search for the boundary path.

The user interface includes tools which help the user designate the highlighted area. These tools enable the user to re-position control points within the designated area and also to adjust the width of the area, making it easy to converge upon a highlighted area with which the user is satisfied.

The present invention allows the program to save the highlighted area so that it can be re-generated for later use and possible modification. A key feature of the present invention is that it is only necessary to store a few control points and highlighted widths in order for the algorithm to generate a correct mask, thus achieving a very high level of compression for the mask. The same algorithm re-applied to the same control points on the same image will produce the same mask.

There is thus provided in accordance with a preferred embodiment of the present invention a method for generating a mask for a desired portion within a digital image including selecting a region containing a boundary of the desired portion, the region being at least partially bounded by an inner outline and an outer outline, the inner outline lying inside of or on the boundary and the outer outline lying outside of or on the boundary, detecting edges which lie within the region using an automated edge detector, and generating a mask based on the region and the edges.

Moreover in accordance with a preferred embodiment of the present invention the mask is used to silhouette the desired portion from the digital image.

Additionally in accordance with a preferred embodiment of the present invention the mask is used to cut out the desired portion from the digital image.

Further in accordance with a preferred embodiment of the present invention the selecting step uses an input device such as a keyboard, mouse, joystick or digital pen, which enables a user to draw continuous brush strokes with varying position and thickness, similar to the behavior of a highlighting marker, and the region corresponds to the area covered by the brush strokes.

Still further in accordance with a preferred embodiment of the present invention the input device includes a digital pen, the motion of the pen corresponding to the position of the brush strokes and the pen pressure corresponding to the brush thickness.

Moreover in accordance with a preferred embodiment of the present invention the input device includes a keyboard, with designated keys used to enlarge and reduce the width of the region at selected locations therein.

Additionally in accordance with a preferred embodiment of the present invention the input device includes a mouse, used to re-position said region and to enlarge and reduce the width of the region at selected locations therein.

Further in accordance with a preferred embodiment of the present invention, the input device may include any suitable combination of input apparatus described above, alone or in combination with additional apparatus.

Further in accordance with a preferred embodiment of the present invention the input device can serve to designate that a brush stroke be a line of zero thickness, thereby forcing the detecting step to use the line as a detected edge.

Still further in accordance with a preferred embodiment of the present invention the two outlines are polygonal curves.

Moreover in accordance with a preferred embodiment of the present invention the polygonal curves are represented as a series of control points, each point characterized by its position and the width of the selected region at that position.

Additionally in accordance with a preferred embodiment of the present invention there is provided an additional step of segmenting the selected region into a plurality of neighboring quadrilateral regions. prior to the step of detecting edges.

Further in accordance with a preferred embodiment of the present invention the two outlines can be adjusted after they are initially selected.

Still further the control points can be modified so as to change their position and width characteristics after they are initially determined.

Moreover in accordance with a preferred embodiment of the present invention there is provided an additional step of sampling the image to obtain pixel color data within the region, prior to the step of detecting edges.

Additionally in accordance with a preferred embodiment of the present invention there is an additional step of filtering the pixel color data with an edge filter, prior to the step of detecting edges.

Further in accordance with a preferred embodiment of the present invention there is provided an additional step of transforming at least one of the quadrilateral regions into rectangular regions which are situated in the horizontal and vertical directions, prior to the step of detecting edges.

Still further in accordance with a preferred embodiment of the present invention there is provided an additional step of sampling the image to obtain pixel color data within the rectangles, prior to the step of detecting edges.

Moreover in accordance with a preferred embodiment of the present invention there is provided an additional step of filtering the pixel color data with an edge filter, which serves to amplify the edges, prior to the step of detecting edges.

Additionally in accordance with a preferred embodiment of the present invention the step of detecting edges is performed through a least cost optimization algorithm.

Further in accordance with a preferred embodiment of the present invention the step of detecting edges is performed through a bridge building algorithm.

Still further in accordance with a preferred embodiment of the present invention the step of detecting edges searches for edges which run dominantly in the horizontal direction.

Moreover in accordance with a preferred embodiment of the present invention the mask is an opacity mask.

Additionally in accordance with a preferred embodiment of the present invention the step of generating a mask includes setting the mask opacity to an opaque value inside the inner outline, setting the mask opacity to a transparent value outside the outer outline, and calculating opacities between the two outlines based on the region and the edges.

Further in accordance with a preferred embodiment of the present invention the step of calculating opacities includes searching for full edge extents by using points on detected edges as seed points and searching therefrom for the extents of edges, and varying mask opacities from opaque to transparent values over the extents of edges.

Still further in accordance with a preferred embodiment of the present invention there is provided an additional step of storing said region and said edges in a file.

There is also provided in accordance with a preferred embodiment of the present invention a method for generating a mask for a desired portion within a digital image from a file containing region data and edge data, the region data representing a region which is the area between two outlines and the edge data representing edges which lie within the region, including extracting the region data from the file, extracting the edge data from the file, and generating a mask based on the region and the edges.

Moreover in accordance with a preferred embodiment of the present invention the mask is used to silhouette the desired portion from the digital image.

Additionally in accordance with a preferred embodiment of the present invention the mask is used to cut out the desired portion from the digital image.

Further in accordance with a preferred embodiment of the present invention the two outlines can be adjusted after the region data is extracted.

Still further in accordance with a preferred embodiment of the present invention there is an additional step of modifying the edges.

Moreover in accordance with a preferred embodiment of the present invention the mask is an opacity mask.

Additionally in accordance with a preferred embodiment of the present invention the step of generating a mask includes setting the mask opacity to an opaque value inside the inner outline, setting the mask opacity to a transparent value outside the outer outline, and calculating opacities between the two outlines based on the region and the edges.

Further in accordance with a preferred embodiment of the present invention the step of calculating opacities includes searching for full edge extents by using points on detected edges as seed points and searching therefrom for the extents of edges, and varying mask opacities from opaque to transparent values over the extents of edges.

There is also provided in accordance with a preferred embodiment of the present invention a system for generating a mask for a desired portion within a digital image including a user interface selecting a region containing the boundary of the desired portion, the region being at least partially bounded by an inner outline and an outer outline, the inner outline lying inside of or on the boundary and the outer outline lying outside of or on the boundary, an edge detector detecting edges which lie within the region using an automated edge detector, and a mask generator generating a mask based on the region and the edges.

Moreover in accordance with a preferred embodiment of the present invention the mask is used to silhouette the desired portion from the digital image.

Additionally in accordance with a preferred embodiment of the present invention the mask is used to cut out the portion from the digital image.

Further in accordance with a preferred embodiment of the present invention the user interface uses an input device such as a keyboard, mouse, joystick or digital pen, which enables a user to draw continuous brush strokes with varying position and thickness, similar to the behavior of a highlighting marker, and wherein the region corresponds to the area covered by the brush strokes.

Still further in accordance with a preferred embodiment of the present invention the input device includes a digital pen, the motion of the pen corresponding to the position of the brush strokes and the pen pressure corresponding to the brush thickness.

Moreover in accordance with a preferred embodiment of the present invention the input device includes a keyboard, with designated keys used to enlarge and reduce the width of the region at selected locations therein.

Additionally in accordance with a preferred embodiment of the present invention the input device includes a mouse, used to re-position the region and to enlarge and reduce the width of the region at selected locations therein.

Further in accordance with a preferred embodiment of the invention, the input device may employ any suitable combination of the above-described apparatus, alone or in combination with other apparatus.

Further in accordance with a preferred embodiment of the present invention the input device can serve to designate that a brush stroke be a line of zero thickness, thereby forcing the detecting step to use the line as one of the detected edges.

Still further in accordance with a preferred embodiment of the present invention the two outlines are polygonal curves.

Moreover in accordance with a preferred embodiment of the present invention the polygonal curves are represented as a series of control points, each point characterized by its position and the width of the region at the position.

Further in accordance with a preferred embodiment of the present invention there is also provided an image segmenter segmenting the region into neighboring quadrilateral regions, prior to the operation of the edge detector.

Still further in accordance with a preferred embodiment of the present invention the two outlines can be adjusted after they are initially determined.

Moreover in accordance with a preferred embodiment of the present invention the control points can be modified so as to change their position and width characteristics after they are initially determined.

Additionally in accordance with a preferred embodiment of the present invention there is also provided an image sampler which samples the image to obtain pixel color data within the selected region, prior to the operation of the edge detector.

Further in accordance with a preferred embodiment of the present invention there is also included an image filter which filters the pixel color data with an edge filter, which serves to amplify the edges, prior to the operation of the edge detector.

Still further in accordance with a preferred embodiment of the present invention there is also included an image transformer transforming at least one of the quadrilateral regions into rectangular regions which are situated in the horizontal and vertical directions, prior to the operation of the edge detector.

Moreover in accordance with a preferred embodiment of the present invention there is also included an image sampler which samples the image to obtain pixel color data within the rectangles, prior the operation of the edge detector.

Additionally in accordance with a preferred embodiment of the present invention there is also included an image filter which filters the pixel color data with an edge filter, prior to the operation of the edge detector.

Further in accordance with a preferred embodiment of the present invention the edge detector operates by a least cost optimization algorithm.

Still further in accordance with a preferred embodiment of the present invention the edge detector operates by a bridge building algorithm.

Moreover in accordance with a preferred embodiment of the present invention the edge detector searches for edges which run dominantly in the horizontal direction.

Additionally in accordance with a preferred embodiment of the present invention the mask is an opacity mask.

Further in accordance with a preferred embodiment of the present invention the mask generator includes a data writer setting the mask opacities to an opaque value inside the inner outline and setting, the mask opacities to a transparent value outside the outer outline, and processor calculating opacities between the two outlines based on the region and the edges.

Still further in accordance with a preferred embodiment of the present invention the processor includes an edge finder searching for full edge extents by using points on detected edges as seed points and searching therefrom for the extents of edges, and an opacity calculator varying mask opacities from opaque to transparent values over the extents of edges.

Moreover in accordance with a preferred embodiment of the present invention there is also included a file writer storing the region and the edges in a file.

There is also provided in accordance with a preferred embodiment of the present invention a system for generating a mask for a desired portion within a digital image from a file containing region data and edge data, the region data representing a region which is the area between two outlines and the edge data representing edges which lie within the region, including a file reader extracting the region data and the edge data from the file, and a mask generator generating a mask based on the region and the edges.

Moreover in accordance with a preferred embodiment of the present invention the mask is used to silhouette the desired portion from the digital image.

Additionally in accordance with a preferred embodiment of the present invention the mask is used to cut out the desired portion from the digital image.

Further in accordance with a preferred embodiment of the present invention the two closed curves can be adjusted after the region data is extracted.

Still further in accordance with a preferred embodiment of the present invention there is also provided an edge processor modifying the edges.

Moreover in accordance with a preferred embodiment of the present invention the mask is an opacity mask.

Additionally in accordance with a preferred embodiment of the present invention the mask generator includes a data writer setting the mask opacity to an opaque value inside the inner outline and setting the mask opacity to a transparent value outside the outer outline, and a processor calculating opacities between the two curves based on the region and the edges.

Further in accordance with a preferred embodiment of the present invention the processor includes an edge finder searching for full edge extents by using points on detected edges as seed points and searching therefrom for the extents of edges, and an opacity calculator varying mask opacities from opaque to transparent values over the extents of edges.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

The present invention will be understood and appreciated more fully from the following detailed description, taken in conjunction with the drawings in which.

DETAILED DESCRIPTION OF PREFERRED EMBODIMENTS

In digital image compositing, silhouetting is the art of extracting a portion of a digital photograph, denoted as the "subject," so that it can be manipulated as an independent object. Once extracted, a subject can be overlaid on a digital image, removed from a digital image, cloned, distorted, and processed in any of the standard methods of digital image processing. Although visually, silhouetting is an easy task, in the digital world it is a complex task, involving advanced user interfaces and such techniques as noise removal, automated edge detection and tracking.

Essentially, the ultimate objective of a digital silhouette tool is to create an intermediate digital image containing only the desired subject. This is commonly done by applying an opacity mask to the original image, from which the subject is being extracted. The mask serves to designate the pixels of the subject as being opaque and the pixels of the remainder of the image as being transparent. Additionally, a mask can include varying opacities between these two extremes, in order to remove fringe artifacts from the silhouette. For applications which can process an image in multiple resolutions, the best representation of a mask is in "resolution-independent" coordinates, treating the image as a continuum of points, so that it can be applied at any desired resolution. Application of the mask would then correspond to digitization from resolution-independent form to pixel coordinates.

Unless the user specifies the boundary of the desired subject with perfect or near-perfect accuracy, finding an appropriate mask involves some form of edge detection. If there are many edges near the boundary, all competing for detection, then this is a near impossible task, unless additional constraints are imposed.

The present invention describes a method and system for silhouetting which works well even Linder conditions of low subject contrast and non-opaque subjects. It requires more input on the part of the user than is repaired by prior art techniques, but operates with a simple user interface. This additional input gives valuable information, about the locations of the edges and serves to provide the necessary constraints for an edge detector to successfully find the appropriate edges.

In the present invention, the user is required to designate an area, similar to the area produced by using a highlighting marker, which encloses the entire boundary path of the subject being silhouetted. Effectively, the user is required to "highlight" a strip over all the edges. Precisely, the highlighted area is the region enclosed between two closed outlines, an inner outline and an outer outline. In a preferred embodiment, the present invention also provides a user interface which serves as an aid to the user, making the highlighting task an easy one.

Once the highlighted area has been specified, an automated part of the silhouetting uses this area as a constraint for locating edges, and begins its automated edge detection phase. In a preferred embodiment of the present invention, the edge detection is accomplished in three stages. The first stage involves segmenting the highlighted area into a sequence of adjacent quadrilateral regions. The second stage involves transforming each of these quadrilateral regions into rectangular regions. Finally, the third stage involves edge detection within the rectangular regions. Each of these stages is described fully below. After completion of the edge detection phase, the present invention enters its mask generation phase.

Figure 1:
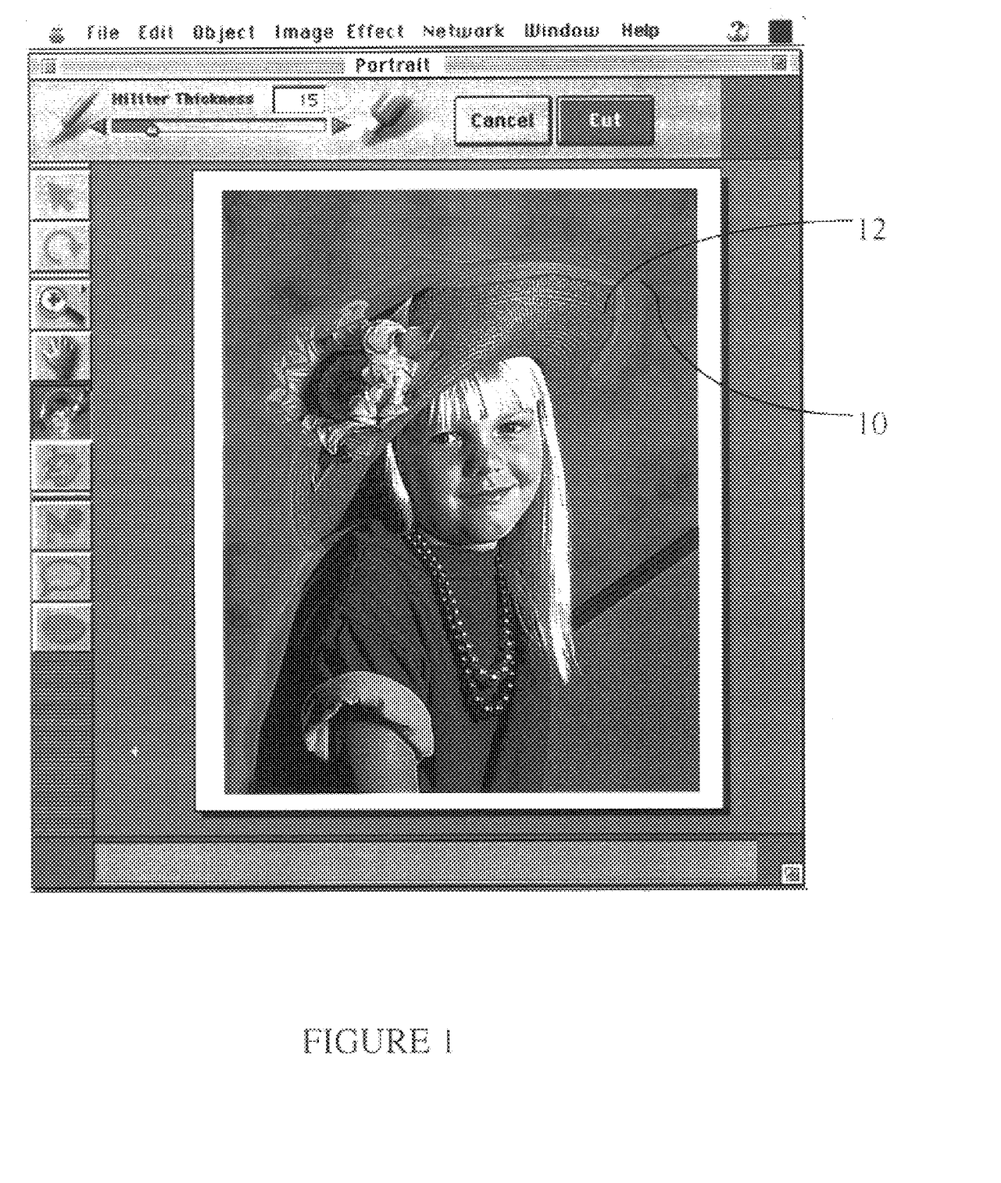
FIG. 1 is a simplified illustration of a highlighted area enclosing the boundary path of a subject to be silhouetted, represented as it would appear when using a highlighting marker.

Highlighting:

FIG. 1 illustrates a highlighted area 10 enclosing the boundary path of a subject 12 to be silhouetted, represented as it would appear when using a highlighting marker. In a preferred embodiment of the present invention, the silhouette tool is activated when the user presses upon a silhouette icon. The tool provides a brush-like interface, whereby the user draws a closed curve free-hand, as if drawing with a highlighting marker. The brush width can be adjusted, and the user tries to highlight over the edges of the desired subject. It is not necessary for the user to be very precise at this stage, since the highlighted area can be adjusted freely.

Figure 2:
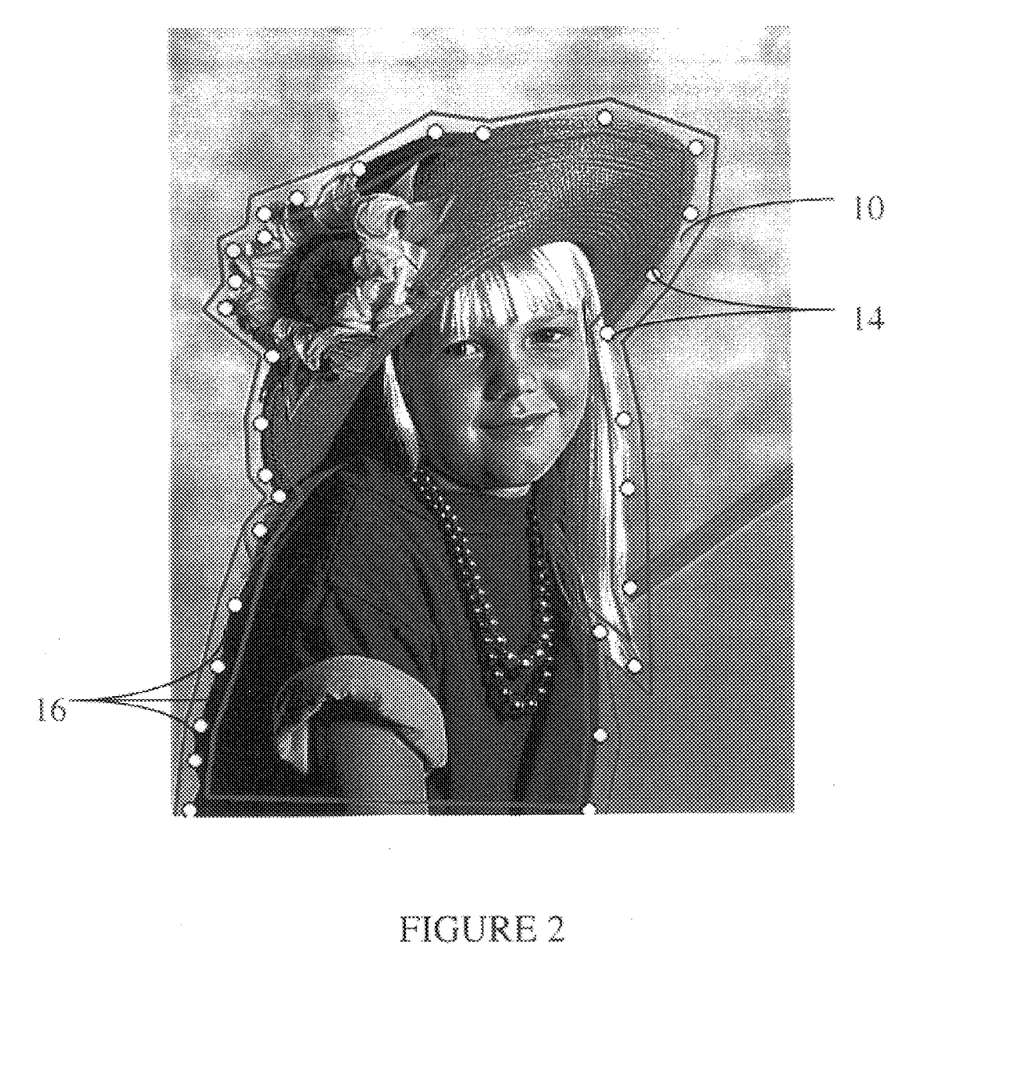
FIG. 2 is a simplified illustration of a highlighted area enclosing the boundary path of a subject to be silhouetted, represented as a sequence of control points with adjustable positions and widths.

Adjusting the Higtlighted Area:

FIG. 2 illustrates the highlighted area 10 enclosing the boundary path of a subject to be silhouetted, which is here additionally represented as a sequence of control points 14 having adjustable positions and widths. In a preferred embodiment of the present invention, this representation is accomplished by first inserting control points 14 along the entire brush path corresponding to the highlighted area, so as to segment the path into linear or nearly-linear pieces 16. Each control point 14 forms a junction where two straight or nearly straight brush lines meet. Identification of the control points 14 can be accomplished using knowledge of the brush positions when the user creates the highlighted area. The control points are preferably centered, so that they are located in the middle of the brush stroke width, i.e. intermediate to the inner and outer outlines bordering the highlighted area 10.

Figure 3:
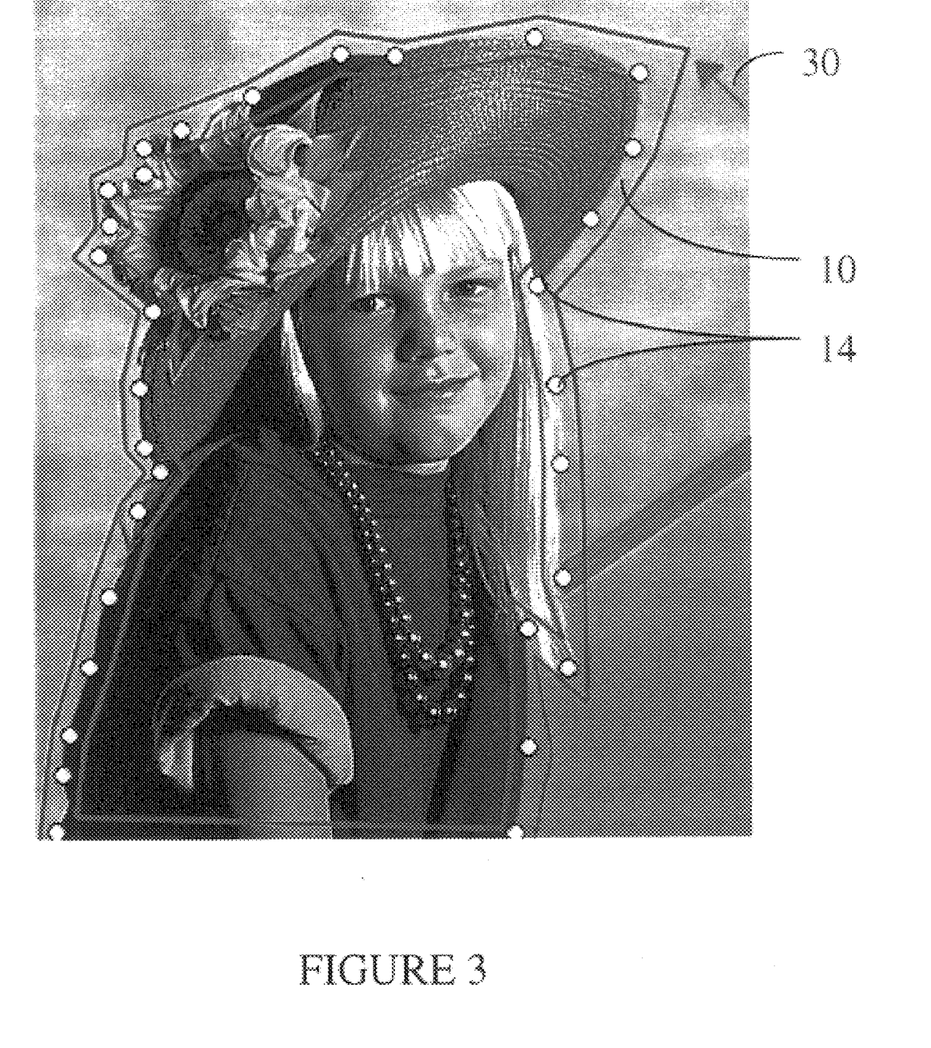
FIG. 3 is a simplified illustration of the highlighted area of FIG. 2, following adjustment by a user.

FIG. 3 illustrates a highlighted area 10 adjusted by a user. Using a mouse input device (not shown), the user "tugs" at one of the polygonal curves at a specific location indicated by an arrow 30, pulling it outwards to increase the thickness of the highlighted area at that location. In a preferred embodiment of the present invention, the user interface allows the user to move any of the control points 14 and to adjust the thickness of the highlighted area 10 anywhere along either of the bounding polygonal curves.

Figure 4:
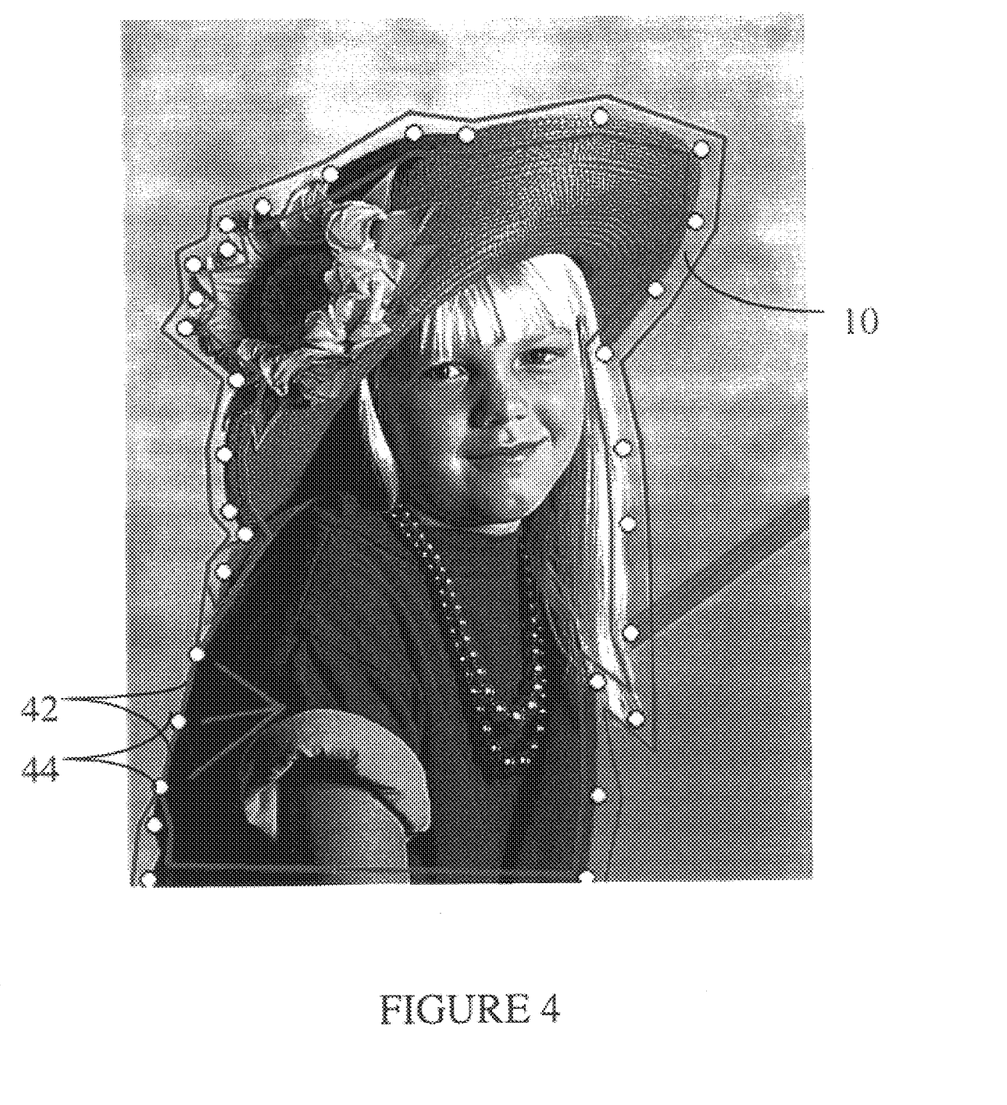
FIG. 4 is a simplified illustration of the highlighted area of FIG. 2 which is collapsed to lines of zero thickness between selected control points.

FIG. 4 illustrates a portion 40 of highlighted area 10 being collapsed to line segments 42 of zero thickness between selected control points 44. This enables the user to coerce the edge detection functionality into forcing the boundary path to fall exactly upon these line segments. In areas of the image where the user suspects that the contrast or opacity is too low for the edge detector to succeed, he can tighten up the highlighted area 10 by collapsing the brush thickness to zero between selected control points. This guarantees that the detected edges will contain these zero thickness line segments. In a preferred embodiment of the present invention, the collapse is performed by a "command-click" keystroke combination on the designated section of the highlighted area.

At this stage the highlighted area has been modified by the user so as to enclose the entire boundary path of the subject, and the required user input has been obtained. Automated processing then takes over, as described hereinbelow.

Figure 5:
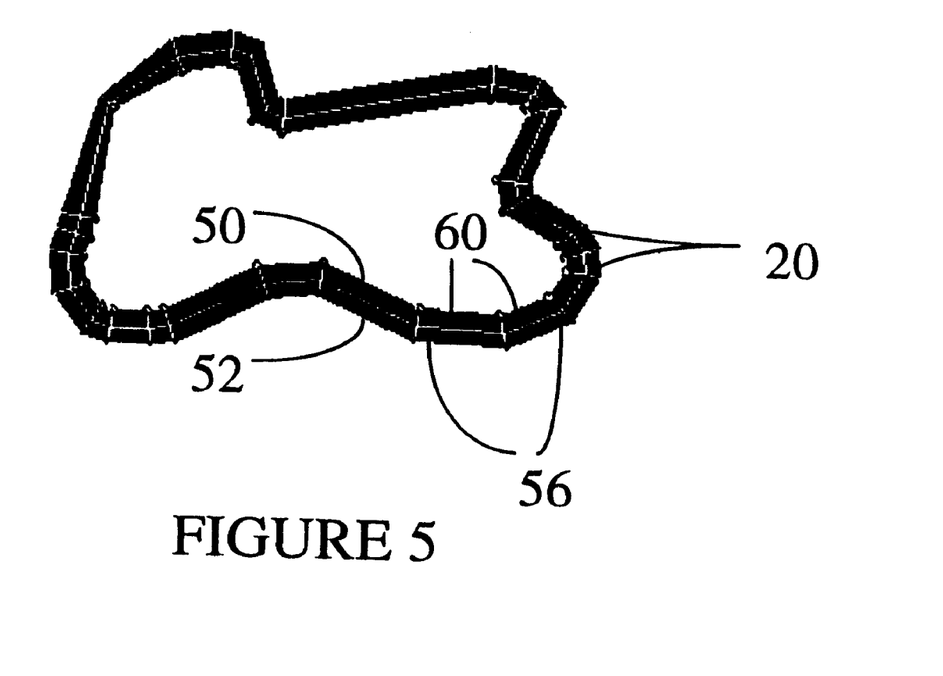
FIG. 5 is a simplified diagram of segmentation of a highlighted area into adjacent quadrilateral regions.

As seen in FIG. 5, at each control point a width segment 20 is drawn. Each width segment cuts across the highlighted area and is centered in a given control point. Its size equals the width of the brush stroke. The width segment 20 is preferably oriented so that it bisects the angle between the two straight brush lines which meet at the control point. Effectively, each control point thus has a position and a width property. The endpoints of the width segments 20 are connected together to form two concentric closed polygonal curves, and inner polygon 50 and an outer polygon 52, corresponding to the inner and outer outlines respectively. Thus, in the preferred embodiment of the present invention being described, the highlighted area is represented as a data structure consisting of a sequence of control points, each having a (two-dimensional) location and a width property. It can be appreciated by those skilled in the art that there are alternate data structures which can be used to represent the highlighted area.

Segmentation:

As illustrated in FIG. 5, in the preferred embodiment of the present invention being described, the highlighted area is bounded by two concentric polygonal outlines 50 and 52, and the corresponding line segments of each polygonal outline are joined transversely by the width segments 20 passing through the control points. FIG. 5 illustrates segmentation of a highlighted area 10 into adjacent quadrilateral regions 56. Each quadrilateral region 56 is determined by two corresponding segments from the inner and outer bounding polygons 50 and 52, and by the two width segments 20 which join their endpoints. It is noted that the bounding polygons 50 and 52 are created by connecting the ends of the width segments together. This affords an alternate data structure representation of the highlighted area—as a sequence of adjacent quadrilateral regions 56. The fundamental objects of the data structure are now quadrilaterals, rather than control points with locations and widths, as in the previous representation.

The edge detection problem can be broken up into locating individual edges 60 within each of the quadrilateral regions 56, provided that these individual edges 60 join together somewhere along the width segments 20 where adjacent quadrilaterals 56 meet. Moreover, it is also known that the appropriate edges 60 being sought run predominantly generally parallel to the sides of the quadrilaterals which lie on the polygonal bounding outlines 50 and 52.

Transformation:

Each of the quadrilateral regions 56 can he mapped onto a rectangular region, having horizontally and vertically aligned sides. The rectangular regions can be arranged together into a single long horizontal strip, so that adjacent quadrilaterals map to adjacent rectangles with a common vertical side corresponding to the width segment 20. In doing so, the sought after edges 60 are also transformed, and run predominantly in the horizontal direction. The edge detection problem is thus converted into a search for predominantly horizontal edges within rectangular image regions, with the constraint that the edges at adjacent rectangles match up common vertical sides. It is apparent to those skilled in the art that the orientation of the rectangles can be chosen differently, so that the sought after edges run in a different direction. For example, the rectangles could be vertically connected, so as to form a long vertical strip, in which case the edges being sought would run predominantly in the vertical direction.

Figure 6:
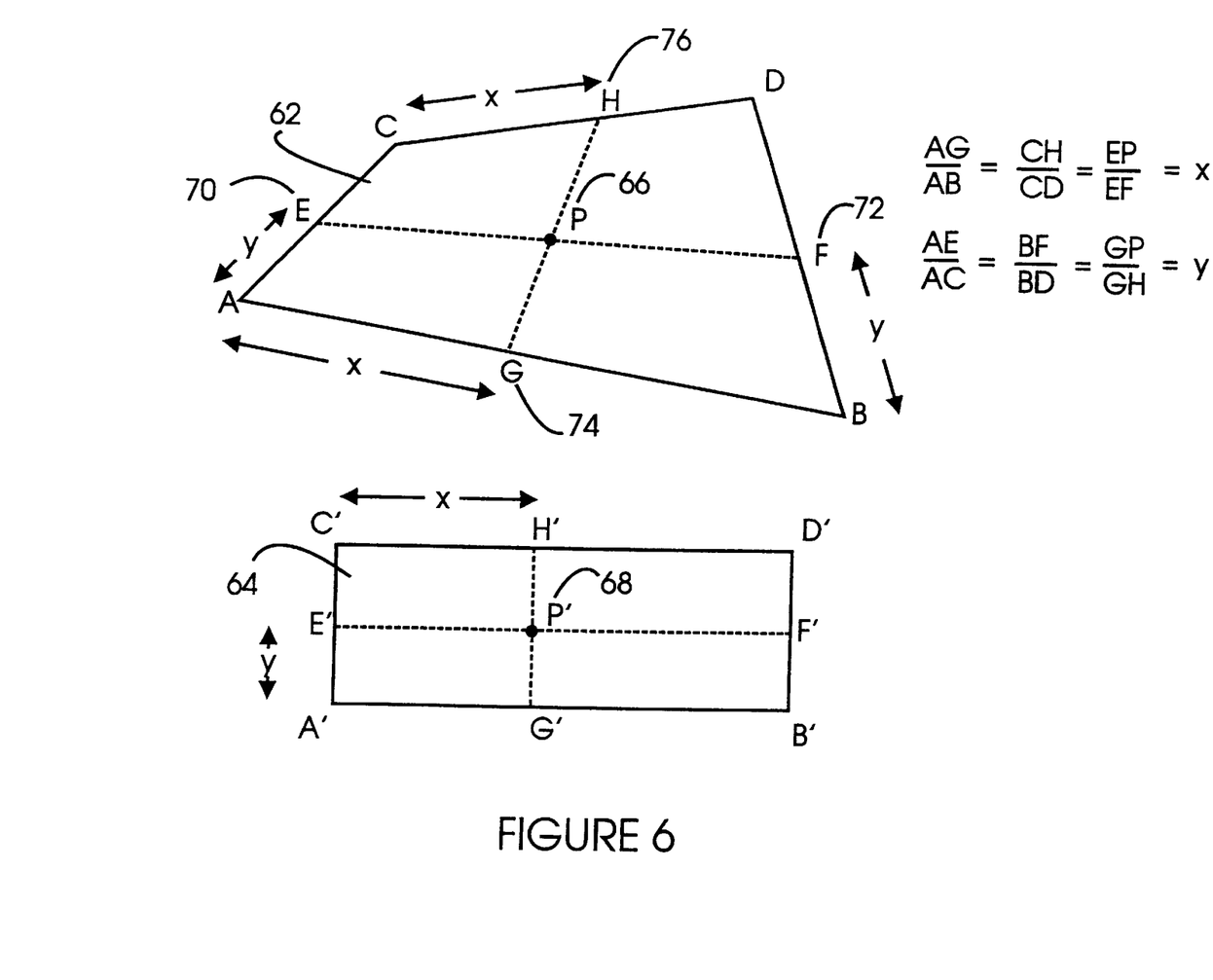
FIG. 6 is an illustration of the mapping used to transform a representative quadrilateral region into a rectangular region.

The actual mapping used to transform a quadrilateral into a rectangle is slightly more general than a standard two-dimensional affine transformation, since it requires eight free parameters. A representative convex quadrilateral region ABCD, designated by reference numeral 62, is illustrated in FIG. 6, along with a rectangular region A'B'C'D', designated by reference numeral 64. To illustrate the mapping it will be explained how a representative point P inside quadrilateral ABCD, designated by reference numeral 66, is mapped to a representative point P' inside rectangle A'B'C'D', designated by reference numeral 68.

As can be seen in FIG. 6, there are unique points E and F lying along the segments AC and BD, respectively, and designated by respective reference numerals 70 and 72, having the property that the three points E, P and F are collinear, and that the ratio of the length of AE to the length of AC is equal to the ratio of the length of BF to the length of BD in other words, the transverse line segment EPF cuts both sides AC and BD in the same ratio. This common ratio is designated by y. and is a number between 0 and 1.

Similarly, there are unique points G and H lying along the segments AB and CD, respectively, and designated by respective reference numerals 74 and 76, having the property slat the three points (C. P and H are collinear, and that the ratio of the length of AG to AB is equal to the ratio of the length of CG to CD. This common ratio is designated by x and is a number between 0 and 1.

Once the values x and y are determined from the point P, as described above, the mapped point P' is defined as the point with the same ratios x and y within the rectangle A'B'C'D'. Specifically, the point P' is defined as the point in the rectangle A'B° C'D'whose relative coordinates are x and y, as illustrated.

This corresponds to bilinear interpolation. Specifically, the point P' with relative coordinates x and y corresponds to the point P given by:

$$P=A+x(B-A)+y(C-A)+xy(D-C-B+A). \quad (1)$$

Thus in transforming the image from source quadrilateral ABCD to target rectangle A'B'C'D', for every pixel location P' in A'B°C'D', the relative coordinates x and y are determined, and then the target image color at P' is set to the source image color at the corresponding pixel location P. The coordinates of P are not necessarily integral, and in a preferred embodiment of the present invention the image color at P is determined by filtering and sub-sampling the image pixel color values in the vicinity of P.

Edge Detection:

In a preferred embodiment, the present invention employs an edge detection algorithm within each of the rectangular image regions. The preferred edge detector employs a bridge-type algorithm such as described in Tarjan, R. E., *Data Structures and Network Algorithms*, Society for Industrial and Applied Mathematics, Phila., Pa, 1983, pgs. 85–95, the disclosure of which is hereby incorporated by reference.

Mask Generation:

The edges of the subject may be hard or soft, and the opacities of the opacity mask must reflect this. Generally, areas within a highlighted area 10 are considered to be opaque, and areas outside are considered to be transparent. The area inside the highlighted area 10 requires a special computation to determine opacity.

In a preferred embodiment of the present invention, once the edge detection phase is complete, an opacity mask is generated by considering each point in the computed edge to be a "seed" point, and seeking vertically from that point in both directions for the ends of the edge. In the inventor's software implementation of the technique currently employed is to consider each seed point as being contained in a convoluton peak.

Inverse Transformation:

Once the mask has been computed, it is transformed back from the rectangles to the quadrilaterals. This requires that the bilinear transformation equation (1) above be inverted. Specifically, referring back to FIG. 6, for each pixel location P in the quadrilateral ABCD, it is necessary to find its relative coordinates x and y. This involves solving a quadratic equation, as x and y must satisfy the relationship from equation (1). The opacity value at P is then set to the corresponding opacity value at the point P' in the rectangle A'B'C'D' with the same relative coordinates x and y. As above, the coordinates of P' may not be integral, in which case a preferred embodiment of the present invention uses filtering and sub-sampling to determine this opacity value.

In an alternative embodiment of the present invention, the inverse transformation step may precede the mask generation step. In this embodiment, once the edges have been detected within the rectangular regions, they are then transformed back to the original geometry of the quadrilateral segments. The edges transform back to curved (non-horizontal) edges, which satisfy the constraints of being connected and falling within the highlighted area. After the edges are transformed back to the quadrilaterals, the mask is generated within the quadrilaterals.

Transforming the edges back from the rectangle to the quadrilateral can be done using the same bilinear transformation described above with reference to FIG. 6. Specifically, for every point pixel location P' lying on an edge in the rectangle A'B'C'D', its relative coordinates x and y are determined, and then the corresponding pixel location P in the quadrilateral ABCD, determined according to equation (1) above, is labeled as an edge. In this embodiment there is no need to invert the bilinear transformation equation (1).

Figure 7:
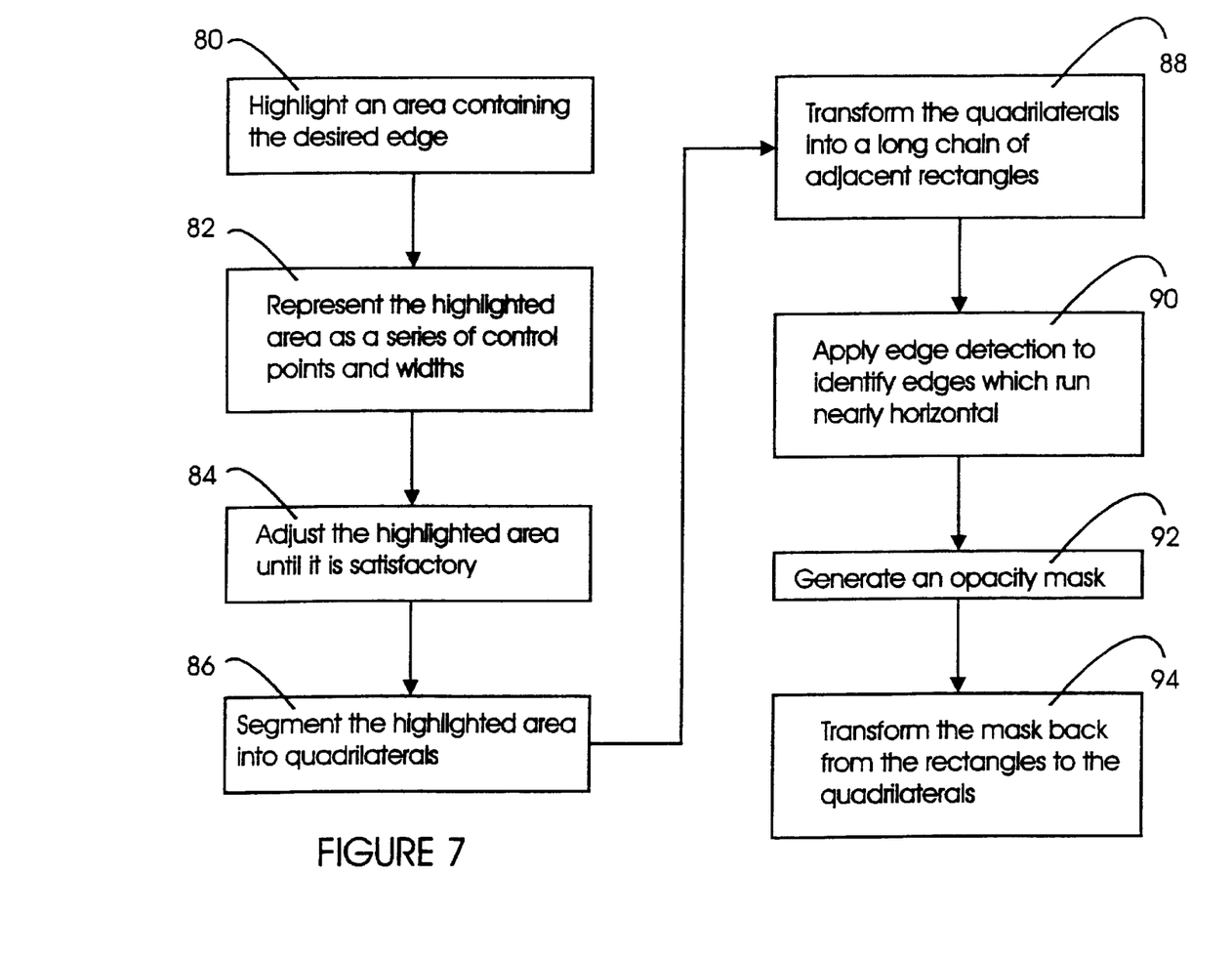
FIG. 7 is a simplified flowchart illustrating a preferred embodiment of the present invention.

FIG. 7 summarizes the present invention and illustrates the overall flow control of a preferred embodiment of the present invention. At step 80 the user tries to highlight an area containing the edge of the desired portion. The highlighted area may be off and miss the edge at certain locations. At step 82 the highlighting program identifies straight segments within the highlighted area, and uses these to represent the highlighted area as a series of control points and widths. At step 84 the user can repeatedly adjust the highlighted area so as to correct for any parts of the edge which it misses, until a satisfactory area is obtained.

At step 86 the highlighting program segments the highlighted area into a series of connected quadrilaterals. At step 88 the quadrilaterals are transformed into a series of connected rectangles situated along the horizontal and vertical directions. At step 90 the highlighting program applies automatic edge detection to identify edges which run dominantly in the horizontal direction. At step 92 the highlighting program generates opacity masks within the rectangles from the edge data and the image data. Finally, at step 94 the masks are transformed back from the rectangles to the quadrilaterals.

Alternatively, in the second embodiment described above, steps 92 (mask generation) and 94 (inverse transformation) can be reversed. That is, the system can first map the edge data from the rectangles back to the quadrilaterals, and then generate the masks within the quadrilaterals. In either embodiment, the outcome is the setting of the mask opacity values within the highlighted area, and the remaining values can then be set by making them transparent for pixel locations inside the innermost outline of the highlighted area, and opaque for pixel locations outside the outermost outline of the highlighted area.

The first embodiment, mask generation followed by inverse transformation, has the advantage of generating the mask within simple rectangular regions, but has the disadvantage of requiring the bilinear transformation equations (1) to be inverted. The second embodiment, inverse transformation followed by mask generation, has the advantage of not requiring the bilinear transform equations (1) to be inverted, but has the disadvantage of generating the mask within non-rectangular quadrilateral regions.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

What is claimed is:

1. A method for generating a mask for a desired portion within a digital image comprising:
    selecting a region containing a boundary of said desired portion, said region being at least partially bounded by an inner outline and an outer outline, said inner outline lying inside of or on said boundary and said outer outline lying outside of or on said boundary;
    detecting edges which lie within said region using an automated edge detector; and
    generating a mask based on said region and said edges.

2. A method according to claim 1 and also including the step of using said mask to silhouette said desired portion from said digital image.

3. A method according to claim 1 and also including the step of using said mask to cut out said desired portion from said digital image.

4. A method according to claim 1 and wherein said selecting step uses at least one input device which enables a user to draw continuous brush strokes with varying position and thickness, similar to the behavior of a highlighting marker, and wherein said region corresponds to an area covered by said brush strokes.

5. A method according to claim 4 and wherein said at least one input device includes a digital pen, the motion of the pen corresponding to the position of the brush strokes and the pen pressure corresponding to the brush thickness.

6. A method according to claim 4 and wherein said at least one input device includes a keyboard, with designated keys being used to enlarge and reduce the width of said region at selected locations therein.

7. A method according to claim 4 and wherein said at least one input device includes a mouse, being used to re-position said region and to enlarge and reduce the width of said region at selected locations therein.

8. A method according to claim 4 and wherein said at least one input device serves to designate that a brush stroke be a line of zero thickness, thereby forcing said detecting step to use said line as one of the detected edges.

9. A method according to claim 1 and wherein said two outlines are two polygonal curves.

10. A method according to claim 9 and wherein said two polygonal curves are represented as a series of control points, each point characterized by its position and the width of said region at said position.

11. A method according to claim 9 and also comprising the step of segmenting said region into a plurality of neighboring quadrilateral regions, prior to said step of detecting edges.

12. A method according to claim 1 and wherein said two outlines are adjusted after they are initially determined.

13. A method according to claim 10 and wherein said control points are further modified so as to change their position and width characteristics.

14. A method according to claim 1 and also comprising the step of sampling the image to obtain pixel color data within said region, prior to said step of detecting edges.

15. A method according to claim 14 and also compromising the step of filtering said pixel color data with an edge filter, prior to said step of detecting edges.

16. A method according to claim 11 and also comprising the step of transforming at least one of said plurality of quadrilateral regions into rectangular regions which are situated in the horizontal and vertical directions, prior to said step of detecting edges.

17. A method according to claim 16 and also comprising the step of sampling the image to obtain pixel color data within said rectangles, prior to said step of detecting edges.

18. A method according to claim 17 and also comprising the step of filtering said pixel color data with an edge filter, prior to said step of detecting edges.

19. A method according to claim 1 and wherein said step of detecting edges is performed through a least cost optimization algorithm.

20. A method according to claim 1 and wherein said step of detecting edges is performed through a bridge building algorithm.

21. A method according to claim 16 and wherein said step of detecting edges searches for edges which run dominantly in the horizontal direction.

22. A method according to claim 1 and wherein said mask is an opacity mask.

23. A method according to claim 22 and wherein said step of generating a mask comprises:
    setting the mask opacity to an opaque value inside said inner outline;
    setting the mask opacity to a transparent value outside said outer outline, and calculating opacities between said two outlines based on said region and said edges.

24. A method according to claim 23 and wherein said step of calculating opacities includes:
searching for full edge extents by using points on detected edges as seed points and searching therefrom for the extents of edges; and
varying mask opacities from opaque to transparent values over said extents of edges.

25. A method according to claim 1 and also including the step of storing said region and said edges in a file.

26. A method for generating a mask for a desired portion within a digital image, comprising:
providing a file containing region data and edge data, said region data representing a region which is the area on or between an inner and an outer outline and said edge data representing edges which lie within said region;
extracting said region data from said file;
extracting said edge data from said file; and
generating a mask based on said region and said edges.

27. A method according to claim 26 and wherein said mask is used to silhouette said desired portion from said digital image.

28. A method according to claim 26 and wherein said mask is used to cut out said desired portion from said digital image.

29. A method according to claim 26 and wherein said two outlines are adjusted after said region data is extracted.

30. A method according to claim 29 and also including the step of modifying said edges.

31. A method according to claim 26 and wherein said mask is an opacity mask.

32. A method according to claim 31 and wherein said step of generating a mask comprises:
setting the mask opacity to an opaque value inside said inner outline;
setting the mask opacity to a transparent value outside said outer outline; and
calculating opacities between said two outlines based on said region and said edges.

33. A method according to claim 32 and wherein said step of calculating opacities includes:
searching for full edge extents by using points on detected edges as seed points and searching therefrom for the extents of edges; and
varying mask opacities from opaque to transparent values over said extents of edges.

34. A system for generating a mask for a desired portion within a digital image comprising:
a user interface selecting a region containing the boundary of said desired portion, said region being at least partially bounded by an inner outline and an outer outline, said inner outline lying inside of or on said boundary and said outer outline lying outside of or on said boundary;
an edge detector detecting edges which lie within said region using an automated edge detector; and
a mask generator generating a mask based on said region and said edges.

35. A system according to claim 34 and wherein said mask is used to silhouette said desired portion from said digital image.

36. A system according to claim 34 and wherein said mask is used to cut out said desired portion from said digital image.

37. A system according to claim 34 and wherein said user interface uses at least one input device which enables a user to draw continuous brush strokes with varying position and thickness, similar to the behavior of a highlighting marker, and wherein said region corresponds to an area covered by said brush strokes.

38. A system according to claim 37 and wherein said at least one input device includes a digital pen, the motion of the pen corresponding to the position of the brush strokes and the pen pressure corresponding to the brush thickness.

39. A system according to claim 37 and wherein said at least one input device includes a keyboard, with designated keys used to enlarge and reduce the width of said region at selected locations therein.

40. A system according to claim 37 and wherein said at least one input device includes a mouse, used to re-position said region and to enlarge and reduce the width of said region at selected locations therein.

41. A system according to claim 37 and wherein said at least one input device serves to designate that a brush stroke be a line of zero thickness, thereby forcing said detecting step to use said line as one of the detected edges.

42. A system according to claim 34 and wherein said two outlines are two polygonal curves.

43. A system according to claim 42 and wherein said two polygonal curves are represented as a series of control points, each point characterized by its position and the width of said region at said position.

44. A system according to claim 42 and also comprising an image segmenter segmenting said region into a plurality of neighboring quadrilateral regions, prior to the operation of said edge detector.

45. A system according to claim 34 and also comprising an outline adjuster for adjusting said outlines after they are initially determined.

46. A system according to claim 43 and wherein said control points are modified so as to change their position and width characteristics after they are initially determined.

47. A system according to claim 34 and also comprising an image sampler which samples the image to obtain pixel color data within said region, prior the operation of said edge detector.

48. A system according to claim 47 and also comprising an image filter which filters said pixel color data with an edge filter, prior to the operation of said edge detector.

49. A system according to claim 44 and also comprising an image transformer transforming at least one of said plurality of quadrilateral regions into rectangular regions which are situated in the horizontal and vertical directions, prior to the operation of said edge detector.

50. A system according to claim 49 and also comprising an image sampler which samples the image to obtain pixel color data within said rectangles, prior the operation of said edge detector.

51. A system according to claim 50 and also comprising an image filter which filters said pixel color data with an edge filter, prior to the operation of said edge detector.

52. A system according to claim 34 and wherein said edge detector operates by a least cost optimization algorithm.

53. A system according to claim 34 and wherein edge detector operates by a bridge building algorithm.

54. A system according to claim 49 and wherein said edge detector searches for edges which run dominantly in the horizontal direction.

55. A system according to claim 34 and wherein said mask is an opacity mask.

56. A method according to claim 55 and wherein said mask generator comprises:

a data writer setting the mask opacities to an opaque value inside said inner outline and setting the mask opacities to a transparent value outside said outer outline; and a processor calculating opacities between said two outlines based on said region and said edges.

57. A method according to claim 56 and wherein said processor includes:

an edge finder searching for fall edge extents by using points on detected edges as seed points and searching therefrom for the extents of edges; and an opacity calculator varying mask opacities from opaque to transparent values over said extents of edges.

58. A system according to claim 34 and also comprising a file writer storing said region and said edges in a file.

59. A system for generating a mask for a desired portion within a digital image, comprising:

a file containing region data and edge data, said region data representing a region which is the area between two outlines and said edge data representing edges which lie within said region;

a file reader extracting said region data and said edge data from said file; and a mask generator generating a mask based on said region and said edges.

60. A system according to claim 59 and wherein said mask is used to silhouette said desired portion from said digital image.

61. A system according to claim 59 and wherein said mask is used to cut out said portion from said digital image.

62. A system according to claim 59 and also comprising an outline adjuster for adjusting said outlines after said region data is extracted.

63. A system according to claim 62 and also including an edge processor modifying said edges.

64. A system according to claim 59 and wherein said mask is an opacity mask.

65. A method according to claim 64 and wherein said mask generator comprises:

a data writer setting the mask opacity to an opaque value inside said inner outline and setting the mask opacity to a transparent value outside said outer outline; and a processor calculating opacities between said two outlines based on said region and said edges.

66. A system according to claim 65 and wherein said processor includes:

an edge finder searching for full edge extents by using points on detected edges as seed points and searching therefrom for the extents of edges; and an opacity calculator varying mask opacities from opaque to transparent values over said extents of edges.

* * * * *